Dec. 17, 1929.  E. W. GARD ET AL  1,739,834
METHOD OF DEHYDRATING OIL
Filed Nov. 16, 1926
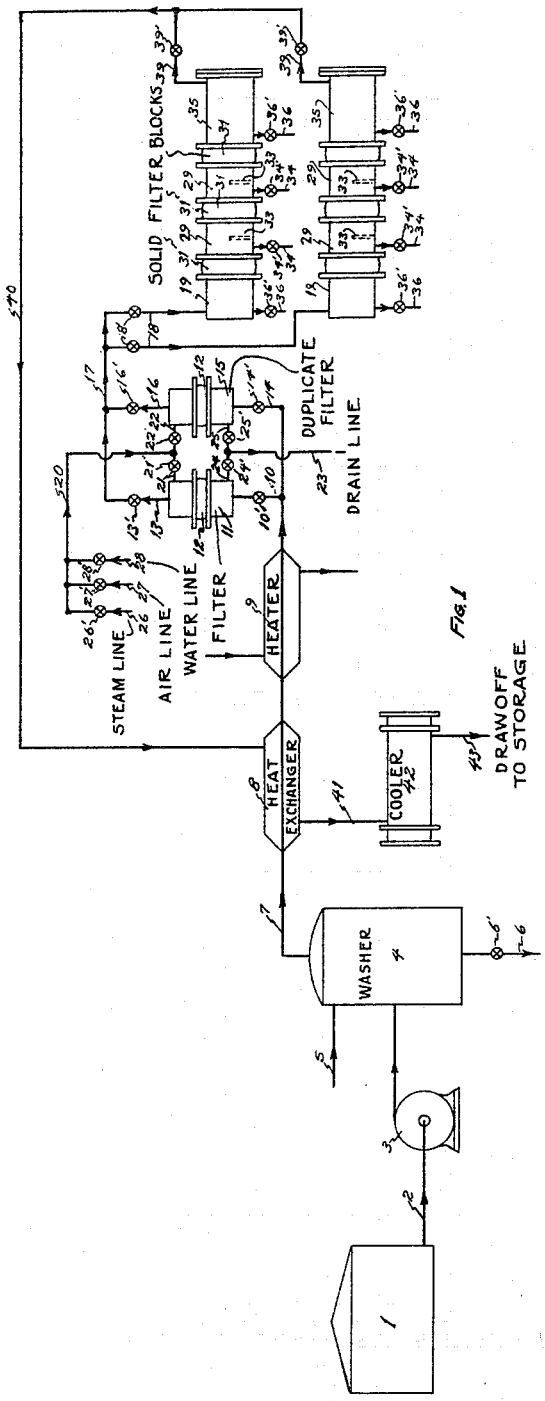
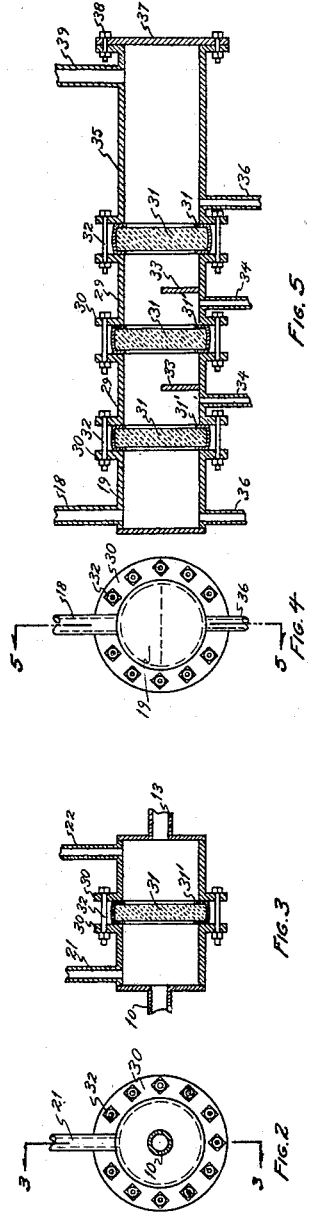
INVENTORS
Earl W. Gard.
Blair H. Aldridge
Hugh J. Multer
ATTORNEY Patented Dec. 17, 1929

1,739,834

UNITED STATES PATENT OFFICE

EARLE W. GARD, OF LONG BEACH, BLAIR G. ALDRIDGE, OF LOS ANGELES COUNTY, AND HUGH J. MULTER, OF HUNTINGTON PARK, CALIFORNIA

METHOD OF DEHYDRATING OIL

Application filed November 16, 1926. Serial No. 148,731.

It is known that the filtration of emulsified oils through bodies containing capillary passages results in an agglomeration of the water phase so that the oil and water on issuing from the capillary passages can be separated for stratification.

The processes and apparatus heretofore employed have depended upon passing the oil through a filter bed composed of such materials as felt, charcoal, sand, diatomaceous earth, etc. The difficulty with such processes and apparatus resides in the fact that channeling occurs in the filter bed and the efficiency of the method and apparatus diminishes at such rate that it becomes impractical in use. Emulsified oil has been filtered through cloth and stratification has been claimed. We find, however, that such processes are impractical and in fact little or no stratification results. We find that in order to obtain stratification by passing the oil through capillary passages, sufficient break is obtained only if sufficient length of capillary passages be formed in a solid material so that no movement of the particles which make up the capillary passages is allowed. This is in order to prevent channeling.

We have found that 200 mesh screens built up so as to provide a considerable length of capillary passages, that is, built up to obtain a thickness of about one inch, blocks of capillary tubes held together by a matrix or by any other mechanical means, or porous blocks such as natural pumice rock cut into slabs, or "filtros" plates which are made by fusing particles of silica together at the point of contact of the silica, to provide a solid plate of capillary passages are useful. Such a process is described in Patents 1,117,601 and 1,118,441. We prefer to use the latter.

The process of separation we believe to be due to the selective absorption of the oil and water on the surface of the capillary passages. These passages have a higher absorptive power for water than they have for oil, and there is therefore, a retardation of the dispersed water phase in the passage of the emulsified oil through the capillary passages. The globules of water adhering in the capillary passages are gradually built by the agglomeration of these water particles. When the globule becomes sufficiently large it moves forward under the pressure of the oil and on reaching the surface of the plate gravitates to the bottom, causing an accumulation of a water layer and a breaking of the emulsion. By placing the plates vertically, the agglomerated phase will gravitate downward, an immediate separation occurs, and a maximum efficiency results. An horizontal arrangement of the plates causes the agglomerated phase to be carried on with the main stream, and re-emulsification occurs. However, by insuring an immediate separation of the agglomerated phase as by withdrawing the same to a separating chamber before passage to the next plate, this re-emulsification may be avoided.

We have found that this separation is equally applicable to gasoline or other petroleum fractions, or to crude oil. We have found that in operating with crude oil that it is essential to remove from the crude oil particles such as "rotary mud", or the capillary passages become rapidly blocked.

The process will be better understood by reference to the accompanying drawing, of which Figure 1 shows a schematic arrangement of an apparatus for carrying out the process of this invention. Figure 2 shows an end view of Figure 3,—Figure 3 is taken on a section line 3—3 of Figure 2. Figures 2 and 3 show the filter used for separating particles from the oil. Figures 4 and 5 show the dehydrating filter. Figure 4 is the end view of the Figure 5 and Figure 5 is a view taken on section line 5—5 of Figure 4.

As was previously stated, this process is equally applicable to any petroleum distillate, such as gasoline, kerosene, gas oil, lubricating oil and fuel oil. The Figure 1 shows its application specifically to crude oil. In Figure 1, 1 is a tank containing the crude oil. 2 is a line connecting tank 1 with pump 3. 3 is a pump which feeds the oil into the washer 4, into which is introduced water through line 5, the water being removed through line 6 controlled by valve 6'. 7 is a line connecting washer 4 with heat exchanger 8 and heater 9. 10 is a line connecting line 7 with filter 11. 10' is a valve in said line. 12 is an agglomerating filter plate composed of capillary passages such as previously mentioned. 13 is a line, in which there is valve 13', connecting the filter with line 17. There is a duplicate filter 15 connected to line 10 by means of line 14 in which there is a valve 14'. 16 is a line, in which there is a valve 16', connecting this filter with line 17. 17 is connected to line 18 in which there is a valve 18', it is in turn connected to a separating filter 19. 20 is a line connected to the upper portion of 11 and 15 by means of lines 21 and 22, in which there are valves 21' and 22'. Filters 11 and 15 are connected to line 23 by means of lines 24 and 25, in which there are valves 24' and 25'. To line 20 are connected a steam line 26 controlled by valve 26' and air line 27 controlled by valve 27', and a water line 28 controlled by valve 28'.

The dehydrating filter 19 is composed of a plurality of sections 29 having flanges 30 (see Figure 5). Between these flanges are plates 31 containing capillary passages. The plates 31 are surrounded by lead gaskets 31' and are held in place between the flanges 30 by means of bolts 32. In these sections are baffle plates 33 and draw-offs 34 situated between the baffle plates on the dehydrating filter. The section 35 is made elongated and contains no baffles, but does contain a draw-off 36. The end of the filter is blanked off with a plate 37 held in place by bolts 38, and immediately in front there is a line 39. This line 39, which is controlled by valve 39' (see Figure 1), is connected to line 40. There are two such filters in parallel, as shown. Line 40 is connected to heat exchanger 8, which is in turn connected by means of line 41 to cooler 42, from which there is a draw-off 43 leading to storage. The filters 11 and 15 are constructed in a similar manner to that of filter 19, but have but one plate 31 (see Figure 3), an inlet 10 and an outlet 13. The plate 31 is held in the same manner as previously, between two flanges 30 held in place by bolts 32 and has a lead gasket 31' as previously.

The operation is as follows: Crude oil in tank 1 is pumped under pressure by means of pump 3 through washer 4 where it meets a counter-current wash of water. This wash separates any mud or carbonaceous material, which might clog up the filters. The excess water is drawn through line 6 and the oil saturated with water is withdrawn through 7. It then passes through heat exchanger 8 and steam heater 9 where it is heated to about 200° F. It is then passed through line 10, valve 10' being open and valve 14' being closed, as are also valves 24', 21' and 16'. It passes through line 13 and 13' free of any mud which may have escaped the wash in 4 and which is caught on the under side of plate 12. The oil then passes through 17 and through one of the filters 19, and through 39 and 40, and passes in heat exchange with incoming oil through 8 and is finally cooled in 42.

The filter 11 tends to clog and must be cleaned periodically. When this is desired, as is evidenced by the increased pressure drop across 12, the valve 10' is closed, valve 14' is open, valve 13' is closed and valve 16' is open. The oil then passes through filter 15. Depending upon the character of the deposit separated in 11 it will be found that water, steam, or air, or a combination thereof, must be blown through the filter to clean it. This is done by blowing backwards through the filter, i. e., by opening valves 21' and 24', and valves 26', 27' or 28', as may be found desirable. The separated mud and water is blown down through line 23. It will be found that after prolonged operation the dehydrating filters may become partially clogged. These may be blown in the manner as filters 11 and 15. Such connections are not shown, but will be apparent to those skilled in the art. Connections as shown allow for the cutting out of one filter and the introduction of the other when this is desired.

The water is separated in filter 19 by the plates 31 and is drawn off through draw-offs 34 or 36, through valves 34' and 36', as shown, to the sewer. The separation, as explained above, occurs by the agglomeration of the water, the water and oil passing through the plates, the droplets of water, observation shows, will fall down the face of the plate as they roll out of the capillary passages, and collect in the sump formed by the baffles 33, and are withdrawn as a water layer through 34.

We have found that it is desirable to wet the plates before starting the treatment to hasten the operation. This may be done by circulating water through the filters. However, the oil may be circulated into the plates so that they are wetted by the water in the oil. In operating with crude oil, or any oil containing more than 1% of water, this wetting occurs so rapidly that no previous wetting is necessary. This is especially true in operating by the process above described wherein the oil is given a water wash.

The above is not to be taken as limiting our invention, but merely as illustrative of the best manner of carrying out our invention, which we claim to be:

The foraminous blocks employed in this invention must contain relatively long fixed capillary passages, such for example those which are made by the partial fusion of meshed sand or silica of the required mesh to give the necessary porosity, and the blocks or plates employed in this invention are preferably approximately 1 inch in thickness. Other filter mediums that may be employed are mineral or spun glass wool securely clamped between screens with a thickness of approximately one inch.

What we claim is:

1. A process of dehydrating and separating solid foreign bodies from an emulsified oil which comprises, first washing the emulsified oil with water to separate the solid foreign bodies, then heating the emulsified oil substantially free of said solid foreign bodies, and passing the same through a series of solid foraminous blocks containing capillary passages to gradually agglomerate the water content contained therein and continually collecting and removing the agglomerated water in stages.

2. A process of dehydrating oil which comprises, passing an emulsified oil heated to a temperature of not less than 150° F. in stages through a series of solid blocks containing capillary passages; thereby agglomerating a portion of the water contained in the emulsified oil then separating and removing the agglomerated water; agglomerating, separating and removing a second portion of the water content from the emulsified oil; continuing said agglomeration, separation and removal of the water contact from the emulsified oil until said oil is substantially free of water.

3. A process of dehydrating oil which comprises, heating emulsified oil to not less than 150° F.; passing the emulsified oil in stages through a series of solid blocks containing capillary passages; thereby agglomerating a portion of the water contained in the emulsified oil then separating and removing the agglomerated water; repeating said agglomeration, separation and removal of the water content of the emulsified oil in stages until said oil is substantially free of water.

4. A process of dehydrating oil which comprises, heating emulsified oil to not less than 150° F.; passing said heated emulsified oil through a filter to remove any solid foreign bodies from the oil; passing the cleansed emulsified oil in stages through a series of solid blocks containing capillary passages; thereby agglomerating a portion of the water contained in the emulsified oil then separating and removing the agglomerated water; repeating said agglomeration, separation and removal of the water content of the emulsified oil in stages until said oil is substantially free of water.

5. A process for dehydrating and removing the solid foreign bodies from an emulsified oil which comprises, first washing the emulsified oil with water to separate the heavier solid foreign bodies, then heating the emulsified oil which now contains only the very light solid foreign bodies, known as "mud", and water; passing said emulsified oil through a filter to remove said lighter solid foreign bodies from the oil; passing the now cleansed, emulsified oil through a series of solid blocks containing capillary passages; thereby agglomerating a portion of the water contained in the emulsified oil then separating and removing the agglomerated water; repeating said agglomeration, separation and removal of the water content of the emulsified oil in stages until said oil is substantially free of water.

In testimony whereof we affix our signatures.

EARLE W. GARD.
BLAIR G. ALDRIDGE.
HUGH J. MULTER.